United States Patent [19]

Overman et al.

[11] 4,130,352

[45] Dec. 19, 1978

[54] PORTABLE MICROFICHE READER WITH FOLDUP LENS AND MIRROR ASSEMBLY

[75] Inventors: John W. Overman, Colgate; George V. Johnson, Oconomowoc, both of Wis.

[73] Assignee: Bell & Howell Company, Chicago, Ill.

[21] Appl. No.: 741,007

[22] Filed: Nov. 11, 1976

[51] Int. Cl.² ............................................. G03B 21/24
[52] U.S. Cl. ....................................................... 353/79
[58] Field of Search ................. 353/27 R, 119, 72, 73, 353/79, 77, 122

[56] References Cited

U.S. PATENT DOCUMENTS

| | | | |
|---|---|---|---|
| 2,847,902 | 8/1958 | D'Incerti | 353/72 |
| 3,743,399 | 7/1973 | Smith | 353/27 R |
| 3,836,242 | 9/1974 | Kluver | 353/27 R |

FOREIGN PATENT DOCUMENTS

| | | | |
|---|---|---|---|
| 1102999 | 5/1955 | France | 353/79 |
| 750319 | 6/1956 | United Kingdom | 353/79 |

*Primary Examiner*—Harry N. Haroian
*Attorney, Agent, or Firm*—Alan B. Samlan; Harry G. Thibault

[57] ABSTRACT

A portable microfiche reader that has a lens and mirror assembly in a housing, pivotally mounted to swing between two positions. When the assembly is swung into one stable position, the mirror and lens system is stored in a position where it interposes no added thickness to the microfiche reader case. When the assembly is swung into another stable position, the lens and mirror are accurately positioned with respect to a microfiche in a reading position. This way, the reader case may be designed to have only the minimum thickness required by the screen, microfiche carriage, and light source. Automatic means are provided to open the fiche-holding glass flats when the carrier is moved forward.

8 Claims, 10 Drawing Figures

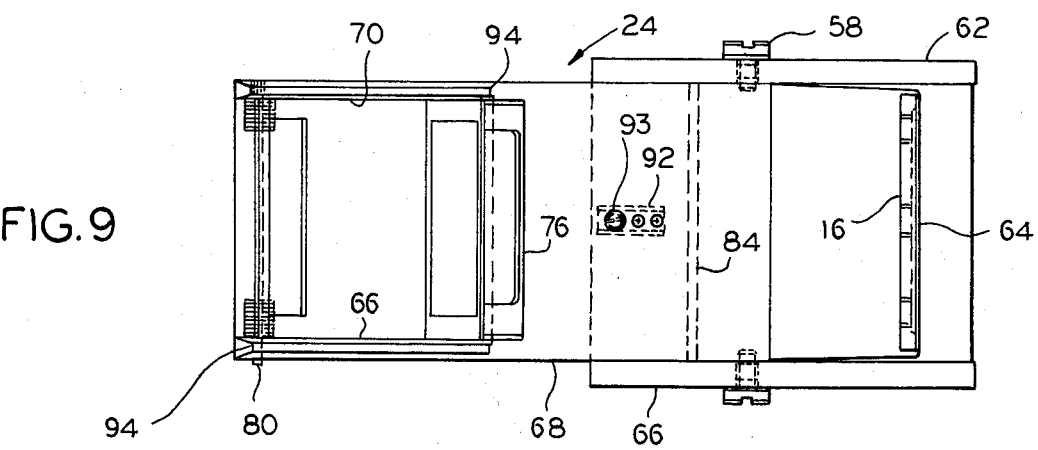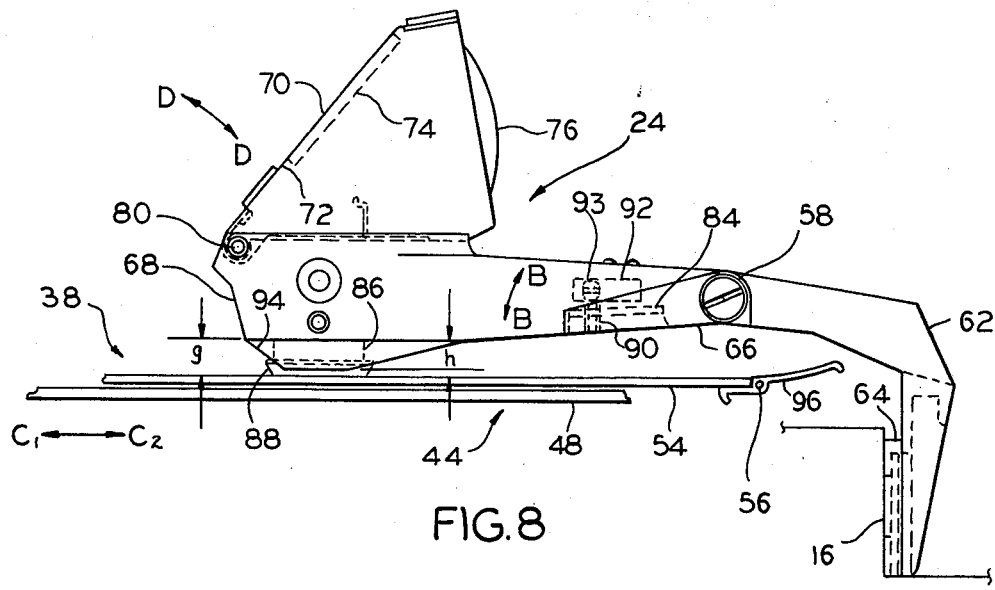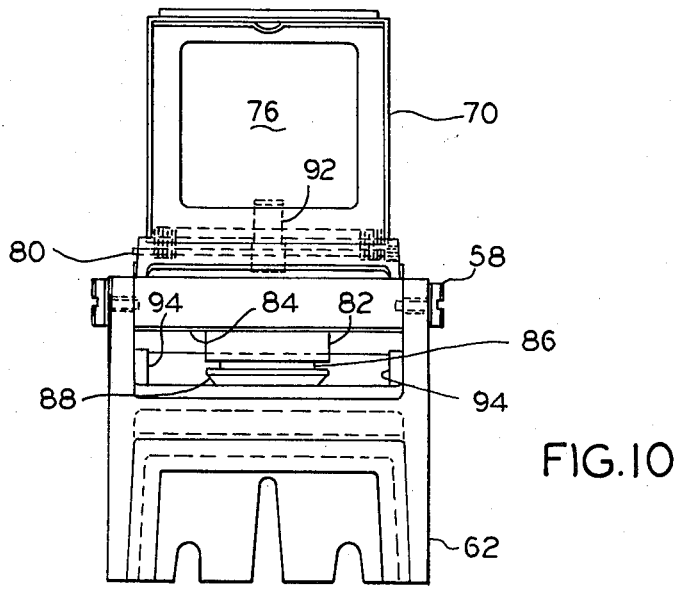

PORTABLE MICROFICHE READER WITH FOLDUP LENS AND MIRROR ASSEMBLY

This invention relates to compact, portable microfiche readers and more particularly to readers with foldup optical and mirror assemblies.

A microfiche is usually a small sheet of film (about the size of a file card) having a plurality of images micropotographed thereon in an orthogonal array. To read the images, it is necessary to provide a microfiche carrier which enables the microfiche to move orthogonally relative to an optical system or projection system. The carrier is moved to place a selected image in the path through the optical system so that the image is projected onto a screen.

A properly designed portable microfiche reader usually looks somewhat like a briefcase or suitcase. The screen is in the top and the carrier, light source and optical system are in the bottom of the case. A portion of the optical system must be interposed between the screen and the carrier. This has inherently made the case wider than it would have been if the optical system could be effectively eliminated insofar as the reader's geometry is concerned.

The optical system is dimensionally critical. If the microfiche or the screen are not precise distances from the projections lens, the projected image may be distorted, out of focus or otherwise unsatisfactory. Also, the light source must transit a beam through the lens with a proper and uniform distribution of light. Therefore, it has been difficult to provide an optical system which is reducible to smaller dimensions.

Accordingly, an object of the invention is to provide new and improved portable projectors, especially — although not exclusively — microfiche projectors. Here an object is to provide microfiche projectors with a slim and compact carrying case.

Yet another object of the invention is to provide projectors having optical systems which may be made compact for carrying, and extended for projection. Here an object is to provide optical and lighting systems which work together to provide compact or extended configurations.

Still another object of the invention is to provide a portable projector wherein the focal length of a projected image is shortened to provide a full and expanded image size in a shortened distance between projection lens and screen.

An additional object of the present invention is to provide a portable projector having a projection assembly housing which folds to a storage position and opens to a projections position, and automatically locks into said projection position.

Still another object of the invention is to provide means responsive to movement of the carrier and the position of the projection assembly housing to open the glass flats for insertion or removal of a microfiche, including means to prevent the projection assembly housing from moving while opening the glass flats.

Yet another object of the present invention is to provide a projection assembly having a pivotable mirror and lens housing portion which selectively moves out of position to permit lenses to be interchanged in the projection assembly.

In keeping with an aspect of the invention, these and other objects are accomplished in a portable microfiche reader having a projection assembly mounted in a bistable housing structure. When the structure is in one stable position, the projection system is folded into a compact position where it interposes no added thickness to the microfiche reader case. When the structure is in another stable position, each element of the projection system is positioned with respect to the microfiche. This way, the case may be designed to be no thicker than is required by the screen, carriage, and light source.

The nature of the invention may be understood best from a study of the attached drawings wherein:

FIG. 8 is a side elevation view of the projection assembly housing and mounting means therefore, including a showing of the relative locations of the microfiche carrier when the carrier is moved forward to open the glass flats;

FIG. 9 is a top plan view of the projection assembly housing and mounting means of FIG. 8; and FIG. 10 is an end elevation view of the projection assembly housing of FIG. 8.

The principal subassemblies of the microfiche reader are a top 10, and bottom 12 of a carrying case, which are hinged together at 13. The top 10 includes a screen 14 on which the image of the microfiche may be projected.

Figure 1:
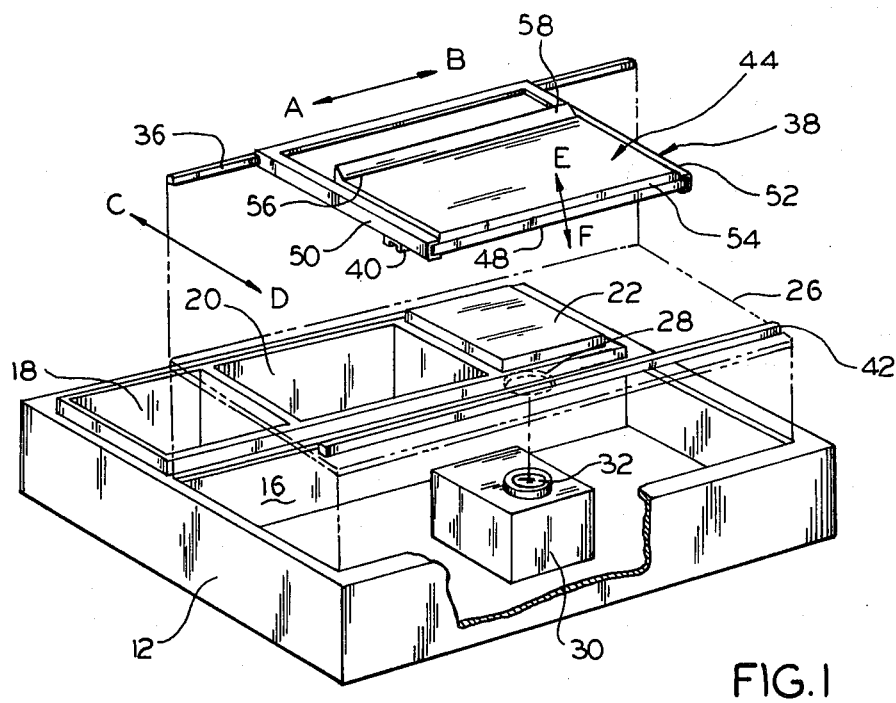
FIG. 1 is an exploded view of the light source and the lower part of the carrying case.
Figure 2:
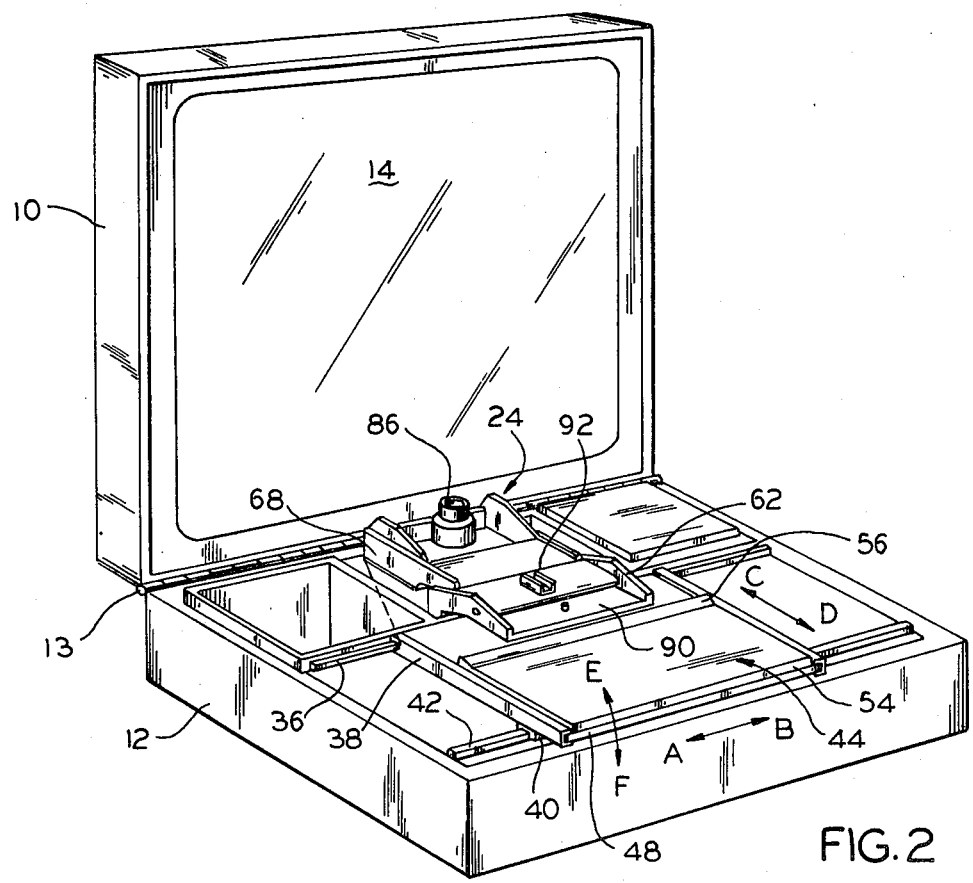
FIG. 2 is a perspective view of the portable microfiche reader with the bistable housing for the projection assembly in the compact or carrying position.
Figure 3:
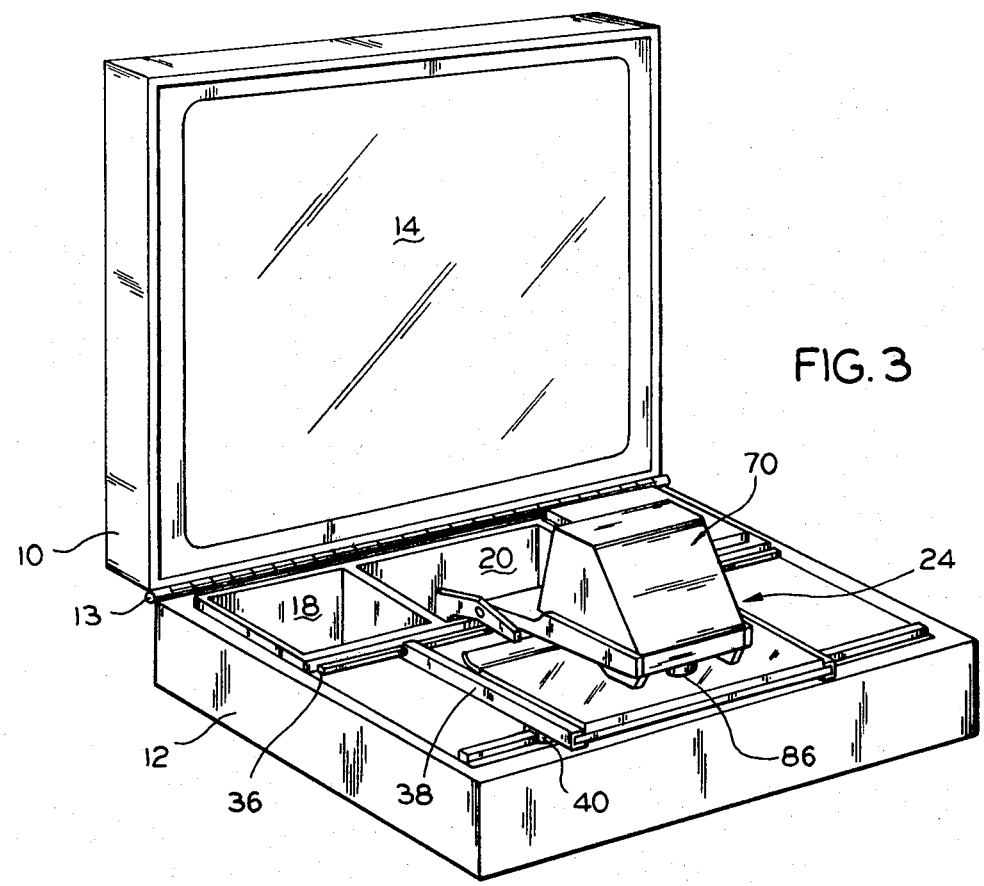
FIG. 3 is a similar perspective view of the portable microfiche reader with the bistable housing for the projection assembly in the projection position.

The bottom 12 of the carrying case comprises a transverse wall 16 (FIG. 1) which divides it into two parts. The part nearest the hinge 13 has three compartments 18, 20, and 22. Compartments 20 is of a shape, size and configuration which receives the pivotable projection assembly 24 in one stable position. The other two compartments may be used for any convenient purpose, such as for storing microfiche, for example.

The other side of the transverse wall 16 is completely covered by one or more removable plates 26 having a hole 28 formed therein. Immediately beneath the plate 26 is a light source 30 of any suitable design. A suitable heat shield and condenser lens system is represented at 32. Therefore, when the light is turned on, a beam is projected upwardly through the hole 28.

Above transverse wall 16, there is a rail 36 having a carrier 38 slidably mounted thereon, for reciprocal motion in directions A, B. The front edge of the carrier 38 has two opposed bearing surfaces, one of which is visible at 40. These bearing surfaces rest under gravity and slide back and forth on rail 42. A pair of glass flats generally designated at 44, are adapted to open and close in order to receive a microfiche between them. The lower one of the glass flats 48 is mounted in spaced parallel channels 50, 52 to slide back and forth in directions C, D.

The upper glass flat 54 is hinged at 56 to raise and lower in directions E, F. When the upper glass flat 54 is raised in direction E, a microfiche may be inserted (or removed) on top of lower glass flat 48. When the upper glass flat 54 is lowered in direction F, the microfiche is clamped in position in a fixed plane between the glass flats 44.

Referring to FIG. 8, the projection assembly 24 is pivotably mounted at 58 to a rigid mounting bracket 62, including a flat portion 64 which is firmly attached to transverse wall 16. A portion 66 of bracket 62 is substantially U-shaped in the horizontal plane (FIG. 9) and extends horizontally outward over orthogonally movable carrier 38.

Figure 6:
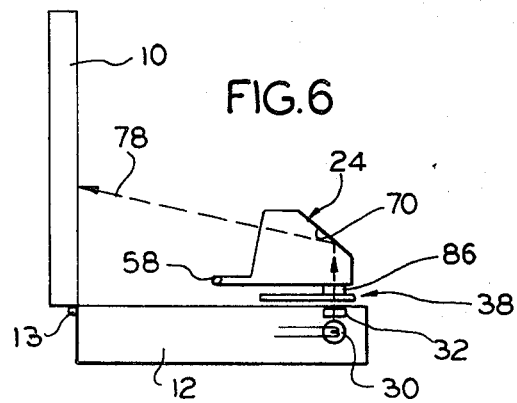

Projection assembly 24 is pivotably mounted to bracket 62 at pivot 58 for movement indicated by the arrow B-B. Accordingly, the projection assembly 24 may be swung in direction G (FIG. 4) until it comes to a stable rest position inside compartment 20. At this point, the lens and mirror units are in a compact, storage position where they add no thickness to the carrying case. Projection assembly 24 comprises a platfom structure 68 upon which a lens and mirror housing 70 is mounted. Housing 70 comprises a sloping inner surface 72 to which a mirror 74 is firmly attached. The angle of surface 72 is such that an image reflected by mirror 74 will pass through beam expander lens 76 mounted on the front of housng 70, and ultimately be projected onto screen 14, as indicated by line 78 in FIG. 6.

In the preferred embodiment, beam expander lens 76 is a negative meniscus lens. The lens is characterized by a shortened focal length which expands the projected image size in comparison to a normal lens. Using lens 76, the image from mirror 74 reaches a pre-determined size at a point closer to lens 76 then would be the case with a normal lens. Thus, a more compact reader can be provided using lens 76 while maintaining a pre-determined image size.

At this front edge, lens and mirror housing 70 is pivotably attached to platform structure 68 at pivot point 80 for movement indicated by the arrow D—D. When housing 70 is pivoted upward, lens bracket 82 is exposed to view, and the removable lens 86 of the portable reader may be removed and replaced.

Counterclockwise movement of projection assembly 24 about pivot 58 is limited by transverse plate 84 which extends across the end of bracket portion 66. In the position shown in FIG. 8, lens 86 is held in bracket 82 such that the lens is properly located above light source and condenser lens system 32. Glass flats 44 extend between the light source and condenser lens system 32 and lens 86 for projection of an image through the lens and mirror housing 70 to screen 14.

Lens 86 is mouunted in lens bracket 82 such that the rim 88 of the lens extends below the bottom plane of platform structure 68 for a specified distance. This distance is designated by the letter "g" in FIG. 8.

Counterclockwise movement of projection assembly 24 is halted by transverse plate 84 such that rim 88 of lens 86 rests gently on the surface of upper glass flat 54. This way, the lens 86 is always located precisely with respect to the glass flats 44. Since glass is an extremely stable material which does not sag or bow, the lens 86 is also maintained at a precise distance away from the microfiche. Obviously, the rim 88 of lens 86 is made of a material which will not scratch upper glass flat 54.

Figure 4:
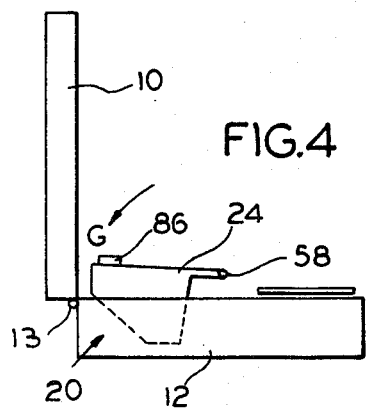
FIGS. 4–7 are four step motion views illustrating how the lens and mirror housing assembly moves between its two stable positions.
Figure 5:
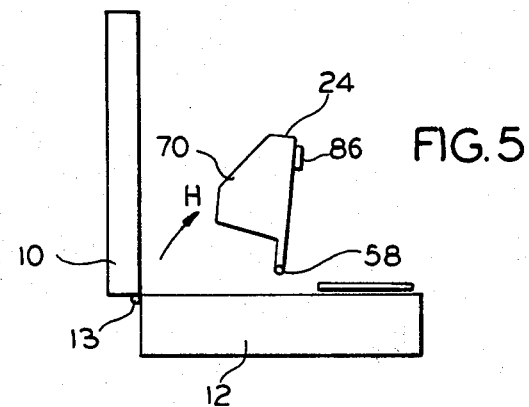

A latch pin 90 is mounted in the center of transverse plate 84 and extends upward therefrom. A spring biased keeper socket 92 is located in platfom structure 68 to engage the globular head 93 of latch pin 90 (FIG. Projection assembly 24 is maintained in the position shown in FIG. 8 by the mating of latch pin 90 and keeper socket 92. A small amount of upward hand pressure is applied to platform structure 68 to release keeper socket 92 from latch pin 90, whereby the projection assembly 24 pivots clockwise about pivot 58 to its storage position in the bottom 12 of the housing, as shown in FIG. 4. Transverse plate 84 maintains projection assembly 24 in its proper position, as shown in FIG. 8, whereby rim 88 of lens 86 rides gently on upper glass flat 54.

A pair of flange elements 94 extend downward from and at the lateral edges of platform structure 68. The lower surface of each flange 94 is flat, and extends below the bottom plane of sturcture 68 for a specified distance, shown as "h" in FIG. 8. It is important to note that the distance "h" is less than the distance "g", for reasons to be explained.

The carrier 38 which mounts glass flats 44 moves in the direction shown by arrow C1-C2 (FIG. 8) as well as the direction into and out of the paper. A curved lifting flange 96 is connected to the rear of upper glass flat 54 on the opposite side of pivot 56 and overhangs the carrier. When carrier 38 is pulled forward (direction C1) to its extremity, lifting flange 96 engages the bottom flat portions of flange elements 94, which exert a downward force on lifting flange 96. Upper glass flat 54 is then pivoted to an open position about hinge 56 to allow for the removal or insertion of a fiche. The pressure applied by latch pin 90 in keeper socket 92 is sufficient to overcome any tendency of platform structure 68 to raise when the carrier is moved all the way forward.

When carrier 38 is moved forward, flange elements 94 engage lifting flange 96, while the rim 88 of lens 86 does not come into contact with flange 96. Thus, the lens 86 does not function in this invention to lift upper glass flat 54 for insertion or removal of a fiche.

Figure 7:
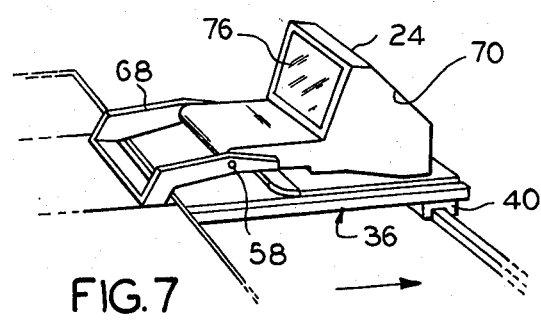

FIG. 7 shows the rear of projection assembly 24 in perspective. Beam expander lens 76 snugly fits into housing 70 so that the entire unit may be sealed against entry of moisture, dirt, or other foreign objects.

When the glass flats are opened, a microfiche is placed upon the lower glass flat 48. Then, the carrier 38 is pushed in direction C2. As lifting flange 96 moves out from under flanged elements 94, the upper glass flat 54 closes to clamp the microfiche between the two flats. Thereafter, the carrier 38 may be moved in either of two directions until a selected image comes to rest under the lens 86.

Those who are skilled in the art will readily perceive how various modifications may be made in this preferred embodiment. Therefore, the appended claims are to be construed to cover all equivalent structures falling within the true scope and the spirit of the invention.

We claim:

1. A projector comprising:
   a bottom case portion and a top case portion,
   hinge means connecting said bottom and top case portions,
   a screen mounted within said top case portion,
   a transverse wall interior of said bottom case portion forming a light emitting area and a storage area,
   light source means in said light emitting area,
   means for completely enclosing said light emitting area except for an opening for emitting said light in an upward direction,
   housing means pivotally mounted to said transverse wall to allow said housing means to swing between a stored position in said storage area and an operating position over said light emitting area,
   lens means mounted on said housing means to rest over said opening when said housing is in said operating position, and means in said housing for reflecting light entering said lens means from said opening, said reflecting means directing said reflected light onto said screen when said top case portion is swung on said hinge means to an upstanding position which is approximately vertical when said bottom case portion is horizontal.

2. The projector of claim 1 and film carrier means interposed between said light emitting area and said housing in said operating position, said film carrier means having a first slide mount for enabling transverse movement parallel to said wall and a second slide mount for enabling movement perpendicular to said transverse movement, whereby film in said carrier may be moved orthogonally in a plane lying between said housing and said area, said lens means having an optical axis perpendicular to said plane when said housing is in said operating position.

3. The projector of claim 2 wherein said carrier has a pair of spaced parallel glass flats lying in said plane, one of said flats being above the other of said flats with said film between said flats, and said lens means rests freely upon the upper one of said glass flats, whereby the distance between said lens means and said film is fixed by the thickness of said upper flat.

4. The projector of claim 3, said housing having associated downwardly extending flange elements, means for pivotally connecting one edge of said upper glass flat to said carrier means so that said upper flat may swing away from or toward the lower glass flat to enable said film to be placed between or removed from between said glass flats while said upper flat is swung away from said lower glass flat, lifting flange means attached to the pivoted edge of said upper glass flat, said lifting flange means curving upwardly with respect to said upper glass flat to raise said upper glass flat when said carrier means is moved so that said lifting flange passes under said flange elements which extend downwardly from said housing.

5. The projector of claim 4 including latch pin and mating keeper socket means associated with said bottom case and said housing means, respectively, for maintaining said housing structure in said operating position against forces tending to pivot said housing structure when said one glass flat is opened.

6. The projector of claim 1 including beam expander lens means disposed in said housing to expand the size of the projected image on said screen.

7. The projector 6 wherein said beam expander lens is a negative meniscus lens.

8. A portable microfiche reader comprising:
a hinged carrying case with top and bottom parts,
screen means within one of said carrying case parts,
lens and mirror assembly means mounted in a pivoted housing structure,
means for storing said mirror housing structure in a storage position within the other of said carrying case parts,
means for supporting said housing structure in an operating position with said lens and mirror assembly defining an optical path focused on said screen when in said operating position,
pivot means for allowing said housing structure to be pivoted from said storage position to said operating position,
light source means disposed within said other part, beam expander lens means mounted on said pivoted housing structure for directing light from said light source means through said lens and mirror assembly and on to said screen when said housing structure is pivoted into said operating position,
carrier means for transporting an array of orthogonal images on a microfiche over any path which places one of said images under said lens when said housing structure is in said operating position, said carrier means comprising a pair of glass flats pivotedly mounted with respect to each other, a lifting flange on one of said glass flats for opening said one glass flat,
flange elements attached to said pivoted housing structure, said flange elements contacting said lifting flange and opening said one glass flat when said carrier is moved to the extremity of one of the orthogonal directions, and
a latch pin and mating keeper socket means on said carrying case and said pivoted housing structure respectively for maintaining said pivoted housing structure in said operating position against forces tending to pivot said housing structure when said one glass flat is opened.

* * * * *